United States Patent [19]
Ferguson

[11] 3,875,317
[45] Apr. 1, 1975

[54] WASTE CONVERSION PROCESS

[76] Inventor: Stuart R. Ferguson, 1140 San Ysidro, Beverly Hills, Calif. 90210

[22] Filed: Sept. 17, 1971

[21] Appl. No.: 181,319

[52] U.S. Cl............... 426/373, 426/447, 426/374, 426/495, 426/431, 127/37
[51] Int. Cl............................................. A23k 1/00
[58] Field of Search............... 99/2, 10, 6, 9; 71/21, 71/22; 127/37; 162/21, 22, 97; 426/371, 372, 373, 374, 425, 431, 445, 447, 455, 478, 480, 489, 495

[56] References Cited
UNITED STATES PATENTS

| | | | |
|---|---|---|---|
| 1,190,953 | 7/1916 | Renshaw | 99/10 |
| 1,695,445 | 12/1927 | Weiss | 99/10 |
| 1,810,239 | 6/1931 | Doolittle | 71/21 |
| 2,022,654 | 12/1935 | Dreyfus | 162/97 |
| 3,079,304 | 2/1963 | Thomsen | 127/37 |
| 3,212,933 | 10/1965 | Hess | 99/10 |
| 3,251,716 | 5/1966 | Porter | 99/2 |
| 3,292,584 | 12/1966 | Brodrick | 99/2 |
| 3,353,947 | 11/1967 | Kramer | 71/21 |
| 3,354,030 | 11/1967 | Williams | 162/22 |
| 3,375,116 | 3/1968 | Anthony | 99/21 |
| 3,503,751 | 3/1970 | Durham | 99/2 |
| 3,523,911 | 8/1970 | Funk | 127/37 |
| 3,622,510 | 11/1971 | Felicetta | 99/2 |

FOREIGN PATENTS OR APPLICATIONS 8,006   7/1915   United Kingdom.................. 99/10

Primary Examiner—Norman Yudkoff
Assistant Examiner—Hiram H. Bernstein
Attorney, Agent, or Firm—Robert O. Richardson

[57] ABSTRACT

A process for converting stable waste (manure and straw) and grandstand waste (principally paper) into useful products such as molasses, regular and activated charcoal, gypsum, acetic acid, furfural produces and fertilizer.

4 Claims, 1 Drawing Figure

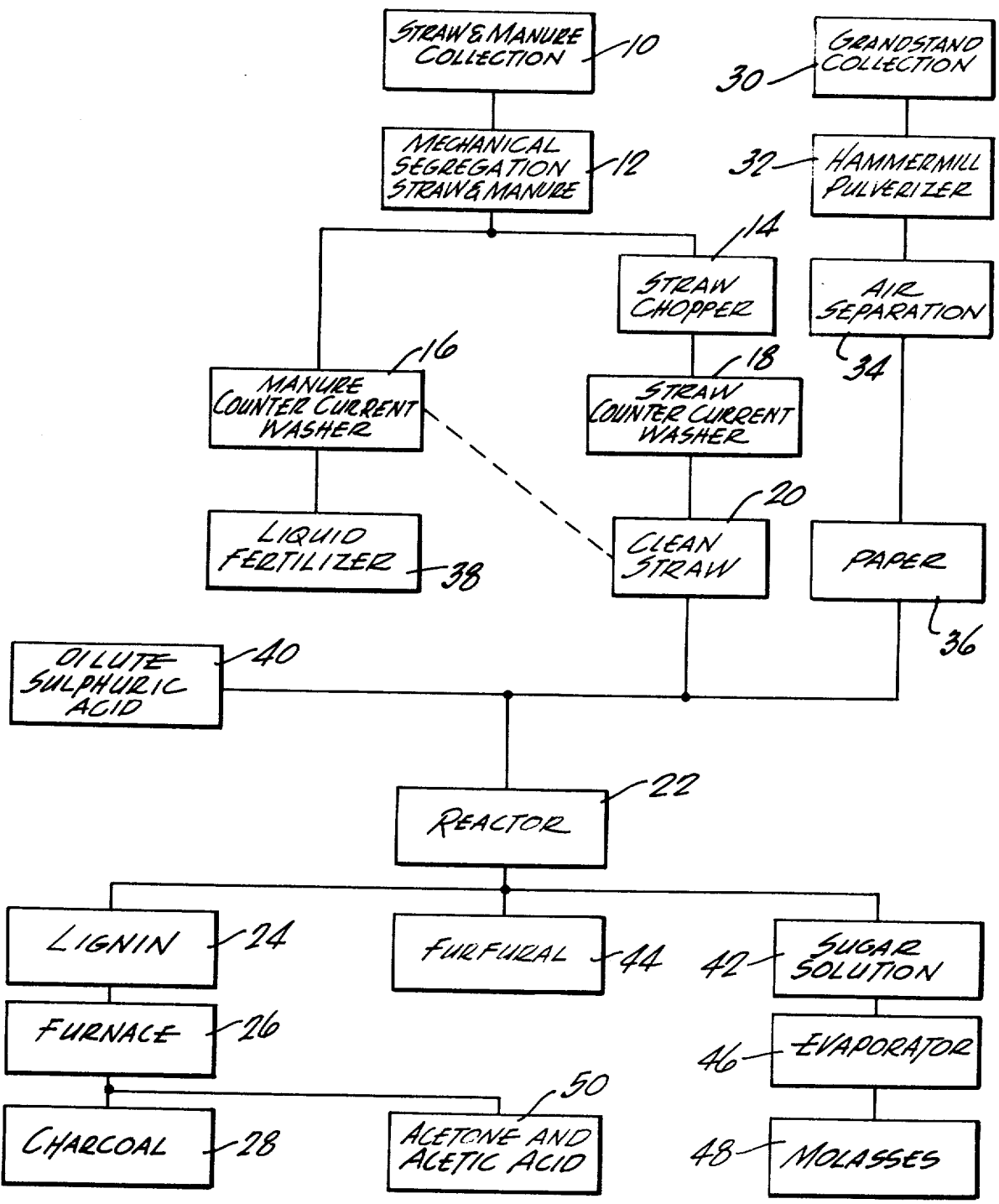

WASTE CONVERSION PROCESS

BACKGROUND OF THE INVENTION

Heretofore manure and straw from stables have been used as fertilizer or has been hauled away as waste. Some kinds of waste paper can be salvaged or recycled but litter paper has no value.

The conversion of wood products such as wood chips, sawdust and pulping residues into cattle feed is now being done. Holocellulose (wood) molasses compares favorably with cane molasses in fattening beef cattle.

The trend toward feeding beef and dairy cattle in large, centralized operations provides an outlet for wood residues as a roughage component in high energy prepared feeds. It also is a source of energy when the carbohydrate constituents are made available for digestion and the lignin from wood is removed. Ruminant animals such as cattle, goats and sheep are preculiarly adapted to digest cellulose.

The low digestibility of carbohydrates in wood is generally attributed to a protective action by lignin. Some form of pretreatment to effect the release of wood carbohydrates from their association with lignin is necessary. One method of releasing wood cellulose and hemicellulose is solubilization by chemical breakdown to sugars, usually by acid hydrolysis. Hydrolysis degrades the cellulose and releases the soluble glucose. Pulping makes cellulose available by removal of lignin and by exposing cellulose without removal of the lignin. The lignin of forages remains largely unused and is excreted.

Wood hydrolysis is the chemical reaction of the cellulosic components in wood with water. Acid is required to catalyze the reaction. The smallest units or single links derived from the cellulose chains by this reaction are sugar molecules. Glucose, which has six carbon atoms in its molecule, is the predominant sugar obtained from wood. Xylose, a 5-carbon sugar comes from hardwoods.

One method of wood hydrolysis uses 40 percent hydrochloric acid at atmospheric pressure in expensive acid-resistant equipment. Another process, called the Scholler process, used dilute sulfuric acid and steam pressures up to 200 pounds per square inch to promote the hydrolysis reaction.

A rapid percolation process using a dilute (0.7 percent) sulfuric acid solution is percolated through wood chips or sawdust in a stationary digester. After an initial low-temperature hydrolysis period, the acid solution is pumped in continuously at the top and hydrolyzate is removed at the bottom. Lime may be used to neutralize the acid in the hydrolyzate. Ammonia may be used instead of lime to add protein value to the molasses product.

The cost of producing wood sugars by an acid hydrolysis process would be lower if the lignin residue from the process had chemical value and could offset a part of the production costs. Lignin is a potential source of reactive compounds that is worth more than as a fuel. A practical method of producing reactive lignin or lignin products, when integrated with the hydrolysis of the cellulosic material in wood, would be important in waste utilization.

Lignin residue is roughly equal to ⅓ the weight of the dry wood charge and is used as a fuel. It will furnish 60 percent of the heat required for the wood-sugar molasses process.

Lignin is a constituent of the cell wall to which it imparts strength and rigidity. The essential grouping of the molecule is believed to be coniferyl alcohol, coniferyl aldehyde, or a compound of closely related structure.

Cellulose is a polysaccharide made up of a chain of betaglucose residues joined at carbon atom 4 by glucosidal linkage, when hydrolyzed, gives rise first to cellobiose and then to glucose.

Hemicelluloses yields mannose, galactose, Xylose, and arabinose when hydrolyzed by dilute acids.

Most of the lignin is present in the middle lamella and other parts of the cell wall are largely made up of cellulose and hemicelluloses.

The chemical structure of the lignin polymer is far more complex than that of the carbohydrates. Most chemical treatments of lignin produces many different chemical fragments. The situation is complicated not only by the large number of different linkages that exist in the lignin structure, but also by the sensitivity of the material.

Lignosulfonic acids are usually used in the utilization of lignin. In addition to the lignosulfonic acids, the crude sulfite liquor contains sugars, carbohydrate degradation products, organic acids, and extractives. When treated with lime, the crude sulfite liquor precipitates calcium lignosulfonates which might be used as stock feed.

Straw is another product having cellulose which provides energy when fed to cattle. However, straw per se in its natural form is unsuitable and must be processed to make it a satisfactory feed.

By-products from straw are acetic acid having many industrial uses, furfural, Xylose, dextrose, and lignin. Lignin may be used in road materials, building materials and plastics. Other end products of straw are insecticides, oil and resin refining, solvents, motor fuel, paints and varnishes, foods and feeds.

SUMMARY OF PRESENT INVENTION

The waste conversion process of the present invention converts stable waste of manure and straw, and grandstand waste (principally paper) into useful products through mechanical handling, chemical conversion, separation, and packaging of the resultant products. These operations are interrelated and combined in a manner that keeps costs at a minimum and produces the type of product that gives the optimum economic yield.

Solid materials are passed over a grid where small sized objects such as manure, metal, stones, etc. are separated from the straw. The straw is then chopped into short lengths, washed, dried, and placed in a combination batch and continuous type reactor chemically where it is converted along with shredded wastepaper therein, into molasses for cattle and sheep feed. A concentrated fertilizer results from the manure washed from the straw while the lignin in the straw, with most of the cellulose removed, is converted into charcoal with acetone, acetic acid and other volitile materials as by-products.

BRIEF DESCRIPTION OF DRAWING

The drawing consists of an illustration of the waste conversion process in diagram form.

DETAILED DESCRIPTION OF ILLUSTRATIVE EMBODIMENT

Reference is now made to the diagram in the drawing which illustrates the various steps in the waste conversion process. In the mechanical handling the first step is the straw and manure collection illustrated by box 10. Solid materials from the stable areas are collected in transportable metal trailers. When full, these are moved to the conversion plant and their contents of manure and straw are dumped into an enclosed storage bin. A belt or screw conveyor moves the manure-straw mixture from the storage bin to a vibrating "grizzly" where small sized objects, such as manure, metal, stones, etc., are separated from the straw. Box 12 represents this step. The straw continues on to a chopper unit 14 where it is cut into lengths of ¼ to ½ inch.

The small solid material, mainly composed of manure, which has been separated by the "grizzly" is moved by conveyor belt to a counter current hot water washer 16. The soluble contents of the manure are removed from the small amount of straw present in this operation. The chopped straw is moved by blower or conveyor belt to a second counter current hot water washer 18 where the solubles in the small amount of manure present is removed from the straw. Two separate washers 16, 18 are of different size because of the different manure-to-straw contents of the two mixtures.

The solids, mainly straw, from both washers are dewatered by roll pressing or centrifuging. The clean straw 20 is then conveyed to a tower unit where it can be distributed into one of several batch type reactors 22. The chemical conversion operation is initiated in the reactor 22.

The solid residue (lignin) 24 remaining after the completion of the reaction is conveyed to a washer to remove the retained soluble sugars and then to a drying unit (furnace) 26 where the remaining water is removed. The dried material is fed directly from the dryer into a calciner (charcoal converter) 28. The charcoal is conveyed from the calciner through a series of coolers and then to a storage bin.

The liquid products from both the counter current washers 16, 18 and the reactor 22 are moved by pumping operations to the various stages of their operations. The final liquid products are pumped into storage tanks.

The grandstand waste is conveyed from storage units illustrated by grandstand collection box 30 to a magnetic separator where iron materials are removed and then to a hammer mill pulverizer 32 where remaining solids are reduced to ½" - ¾" size. These solids are then blown into a pneumatic separator represented by air separation box 34 where the glass and metal are separated from the plastic and paper. The paper 36 is separated from the plastic in a cyclone separator and then moved pneumatically to one of the reactors 22. When mixed with straw in the reactor, the paper does not mat or cause channeling of the liquid as it passes through the paper.

The washing of the straw and manure, in washer 16, although not a conversion process, produces a liquid that is useful as a fertilizer 38 when it is concentrated by flash evaporation, and its nitrogen content is increased by the addition of urea, ammonia, or ammonia nitrate. A minimal amount of evaporation should be required for concentrating the liquid. Flash evaporation is recommended wherein the liquid is heated to 240°F and dropped to 100°F with a condenser at a partial vacuum. The residual heat evaporates a portion of the water to concentrate the liquid.

The acid hydrolysis of the washed straw, manure, and paper waste is in reactor 22 the heart of the processing operation. The resultant product of wood-type molasses is marketable in the large cattle feeding industry in Southern California and elsewhere. The conversion process to be used in this plant is based on a large amount of technical research and development and economical studies relative to the conversion of waste wood products that have been performed by the Northern Research Laboratory of the U.S. Department of Agriculture at Peoria, Illinois and the Forest Products Laboratory of the U.S. Department of Agriculture at Madison, Wisconsin. Additional process development has also been carried out in Canada, Germany, Russia, Sweden and Switzerland. Improvements and invention thereover will be more fully set forth in the appended claims.

The cellulose substances in straw and paper are of a very complex chemical nature which varies according to the source of the material. Thus, the acid hydrolysis process is dependent upon predetermined process parameters. The yield of sugar in the molasses is a function of the acid concentration, pressure, temperature, and time. The amount of conversion is increased by higher acid concentration, temperature and pressure and longer time. The processing procedures must also take into account the fact that the less chemically complex cellulose substances are more readily converted by hydrolysis than those of a more complex structure.

Thus, in accordance with this invention, a percolation process is used in which the acid concentration and operating pressures are gradually increased and the sugar produced is withdrawn continuously and a portion recycled to increase the sugar concentration. Although this process results in a complex chemical relationship, the operational procedure is not difficult once the parameters are determined. It is limited, however, by the available materials of construction since few materials are capable of withstanding the attack of dilute sulphuric acid (in box 40) at high temperature and pressure. The least expensive and most readily available material is glass-lined steel similar to the familiar glass-lined home water heaters.

The processing parameters to be used in the conversion operation in the reactor 22 will be based on producing the most useful and marketable products. The initial step will use 0.1 percent sulphuric acid at a temperature of 240°F, since under these conditions the major portion of the hemicellulose is converted to sugar 42 with a minimum production of furfural 44. Furfural is a chemical product that is undesirable in molasses for cattle feed. An example of the parameters of the process to be used are as follows:

| Time - Hrs. | Temperature °F | Acid Concentration % |
|---|---|---|
| 0.20 | 240 | 0.1 |
| 0.35 | 340 | 0.5 |
| 0.35 | 360 | 1.0 |
| 0.30 | 375 | 2.0 |
| 1.20 Total | | |

The sugar solution of 5 – 7 percent sugar content will be continuously drawn off at a rate about equal to the recirculation rate. This recirculation rate is a function of the cellulose conversion and the rate of buildup of the sugar concentration.

A vent, with condenser, will be used at the top of the reactor 22 to remove the volatiles from the conversion as quickly as possible, since condensates of furfural, alcohol, acetic acid, and ketones will produce polymers in the molasses if allowed to condense in the reactor. The elimination of the volatiles from the molasses will increase its shelf life considerably.

The withdrawal of the sugar solution on a continuous basis will improve the heat balance of the process since the solution can be flashed as it is removed from the reactor at a temperature in excess of 300°F and a pressure of over 100 psi. The operation of the condenser and reheater is for the evaporation of a portion of the excess water. This will increase the sugar concentration in proportion to the temperature drop and pre-heat the make-up water for the reactor.

The cooled solution of sugar and sulphuric acid is next neutralized in a mixing tank with a calcium hydroxide solution. A precipitate of calcium sulphate (gypsum) is produced by chemical reaction. After the gypsum has settled to the bottom tank the solution is decanted and filtered. The gypsum is dewatered, rinsed with hot water, dewatered, and readied for shipment.

The sugar solution that passes through the filter is pumped to a multiple-effect evaporator 46. In the evaporator the solution is concentrated to about a 55 percent molasses content. The exact concentration will be dependent upon customer requirements and shipping costs. The State of California requires a 48 percent minimum sugar content if it is offered for sale as molasses (box 48).

The solid residue remaining in the reactor 22, after the sugar and sulphuric acid solution is removed, is expelled by steam pressure from the reactor into a sump upon opening a quick-release valve. The rapid expansion causes the solids to "fluff-up" into a lower density mixture. The mixture is conveyed from the sump to a set of rollers where water is removed. The dewatered solids (normally called lignin 24) are fed from the rollers into a gas-fired furnace 26 and then into a calciner operating in the range of 750°F for conversion by pyrolysis into charcoal 28. After calcining the barbeque charcoal, when mixed with hardwood charcoal, can be briquetted and sold as barbeque briquettes. The "activated" portion is sold as activated carbon. The sales price of the latter product is many times that of the price of briquettes. The addition of the activation step in the process is dependent upon evaluation of the quality of the activated carbon produced from the lignin. It is a function of a portion of the cellulose and the rate of expansion above mentioned when the material is removed from the reactor. Barbeque and activated charcoal are separated by screening and other techniques. The complete removal of cellulose destroys the possibility of the activation of the residual material. The characteristics of the carbon activation can be controlled by the degree of cellulose conversion to sugar.

There are three ways of upgrading the charcoal from barbeque briquettes to the more financially desirable activated charcoal. The first is in the amount of cellulose removed from the straw, which is governed by time, temperature and acid concentration. When too much is removed, a gummy mass results. When not enough, no activation occurs. The second is the sudden expansion during blowdown to increase the surface area. This has a profound effect on the cell structure of the residual material which, in turn, affects its activation characteristics. The third factor affecting its degree of activation is the rate of calcining. When too fast it collapses the structure and when too slow it becomes glazed. A good grade of carbon results from a 500° to 750°F heat for about 3 minutes.

The volatiles from the pyrolysis of the lignin will be composed of acetone and acetic acid 50, and other similar chemicals. These can be condensed and mixed with the condensates from the reactor 22 for processing into saleable products by standard chemical procedures.

The products resulting from the washing, chemical conversion, and liquid concentration operation are, in general, to be marketed in a bulk form. In one plant, storage tanks with sufficient capacity for 2 days of production plus the volume of the tanker truck for transportation will be required for both the molasses and liquid fertilizer.

The charcoal produced will be both of the briquette grade and activated carbon grade. The briquette grade material can either be briquetted and sacked in this plant, or preferably, be trucked in bulk form to a company with facilities for briquetting. The activated grade will require a mechanical screening operation, air tight storage bins, and a packaging facility. The air tight requirements are required to prevent adsorption of smog and other contaminants from the air that will degrade the product.

The acetic acid and furfural products are to be pumped into 5 gallon carboys unless the purchaser requires containers of other size.

Having thus described an illustrative embodiment of the present invention, it is to be understood that modifications thereof will become apparent to those skilled in the art and it is to be understood that these deviations are to be construed as part of the present invention.

What is claimed is:

1. A method of converting waste of stable manure and straw comprising the steps of:
   1. separating soluble contents of manure from straw for subsequent utilization as fertilizer,
   2. chopping and washing the straw and insoluble contents of manure,
   3. subjecting said straw and manure insoluble contents to acid, temperature and pressure for hydrolysis thereof in a pressure container for conversion thereof into a sugar solution and a residue, and
   4. quickly reducing the pressure on said residue to permit rapid expansion thereof into a lower density mixture.

2. The method of claim 1 wherein hot steam is used to pressurize said container and the pressure is suddenly reduced by opening a quick-release valve connected thereto.

3. The method in claim 1 wherein the cell structure of the residue mass is fractured by suddenly expelling said residue from said container by steam pressure.

4. The method in claim 1 wherein the temperature is about 300°F. and the pressure is about 100 psi.

* * * * *